United States Patent [19]

Cline et al.

[11] Patent Number: 5,166,876
[45] Date of Patent: Nov. 24, 1992

[54] SYSTEM AND METHOD FOR DETECTING INTERNAL STRUCTURES CONTAINED WITHIN THE INTERIOR REGION OF A SOLID OBJECT

[75] Inventors: Harvey E. Cline, Schenectady; William E. Lorensen, Ballston Lake, both of N.Y.

[73] Assignee: General Electric Company, Schenectady, N.Y.

[21] Appl. No.: 641,615

[22] Filed: Jan. 16, 1991

[51] Int. Cl.$^5$ .............................................. G06F 15/42
[52] U.S. Cl. ................................. 364/413.13; 395/124
[58] Field of Search ......................... 382/9, 22, 26, 6; 340/729; 395/124; 364/413.13, 413.14, 413.22

[56] References Cited

U.S. PATENT DOCUMENTS

| | | | |
|---|---|---|---|
| 4,710,876 | 12/1987 | Cline et al. | 364/413.22 |
| 4,719,585 | 1/1988 | Cline et al. | 395/124 |
| 4,729,098 | 3/1988 | Cline et al. | 364/413.18 |
| 4,751,643 | 6/1988 | Lorensen et al. | 364/413.13 |
| 4,771,467 | 9/1988 | Catros et al. | 382/6 |
| 4,843,629 | 6/1989 | Mischler et al. | 382/6 |
| 4,843,630 | 6/1989 | Catros et al. | 382/6 |
| 4,903,202 | 2/1990 | Crawford | 364/413.13 |
| 4,904,994 | 2/1990 | Sasser et al. | 340/744 |
| 4,905,148 | 2/1990 | Crawford | 364/413.13 |
| 5,056,146 | 10/1991 | Nishide | 382/6 |

OTHER PUBLICATIONS

Gonzalez et al., *Digital Image Processing*, Addison-Wesley Pub. Co., 1987 pp. 30, 31, 368-373.
J. D. Foley et al., Fundamentals of Interactive Computer Graphics, pp. 255-261, Addison-Wesley Publishing Co., Reading, Mass., 1982.
H. E. Cline et al., "3D Reconstruction of the Brain from Magnetic Resonance Images Using a Connectivity Algorithm," Magnetic Resonance Imaging, vol. 5, No. 5, p. 345, 1987.
H. E. Cline et al., "Two Algorithms for the Three-Dimensional Reconstruction of Tomograms", Medical Physics, vol. 15, No. 3, p. 320, May/Jun. 1988.

*Primary Examiner*—Robert Weinhardt
*Assistant Examiner*—David Huntley
*Attorney, Agent, or Firm*—Marvin Snyder

[57] ABSTRACT

In a method and apparatus for detecting and displaying arbitrary interior surfaces of a three-dimensional body from a regular array of values of at least one physical property in the interior of the body, the physical property measurements are made with systems such as computerized tomographic x-ray imaging, or magnetic resonance imaging. A recursive algorithm starts with a seed voxel in the surface of interest and continues to all adjacent voxels having a common face which is penetrated by the surface of interest. The common surface penetrations are derived from a look-up table which lists the adjacent voxels having a common penetrated face for each voxel index. The voxel index, in turn, is the string of binary digits representing the voxel vertices whose vertex values exceed the surface value of the surface of interest. The resulting list of voxels can be processed by conventional processors to display the surface of interest with greatly reduced interference from nearby, closely intermingled surfaces with the same or similar surface values.

4 Claims, 4 Drawing Sheets

SYSTEM AND METHOD FOR DETECTING INTERNAL STRUCTURES CONTAINED WITHIN THE INTERIOR REGION OF A SOLID OBJECT

This application is a continuation of application Ser. No. 07/282,666, filed Dec. 12, 1988, now abandoned.

TECHNICAL FIELD

This invention relates to display systems for displaying interior surfaces within solid bodies, and, more particularly, to systems for detecting and displaying a single interior surface intermingled with other surfaces having similar physical properties.

BACKGROUND OF THE INVENTION

It is well known to obtain three-dimensional arrays of data representing one or more physical properties at regular grid positions within the interior of solid bodies. Such data can be obtained by non-intrusive methods such as computed axial tomographic (CAT) x-ray scanning systems, by nuclear magnetic resonance (NMR) imaging systems, or by other non-intrusive mechanisms such as ultrasound, positron emission tomography (PET), emission computed tomography (ECT) and multimodality imaging (MMI). Each of these techniques produces a planar, grid-like array of values for each of a succession of slices of the solid object, thus providing a three-dimensional array of such values. Typically, the solid object is a human body or a portion thereof, although the method is equally applicable to other natural or artificial bodies. In the case of CAT scanning, the physical value would be the coefficient of x-ray absorption. For NMR imaging, the physical value would be the spin-spin or the spin-lattice relaxation time. In any event, the measured physical values reflect the variations in composition, density or surface characteristics of the underlying physical structures. Such a three-dimensional data array typically consists of a plurality of sets of three-dimensional (x, y, z) coordinates distributed at regular positions in a cubic or parallelepiped lattice within the body, and at least one value ($V_{xyz}$) of the physical property being associated with each respective one of the coordinate positions. Each cubically adjacent set of eight such positions defines a cubic volume called a "voxel" with a physical property value being specified for each of the eight voxel vertices. In turn, each voxel "neighborhood" includes the voxel itself and the immediately adjacent six voxels which share a common face; thus, a voxel neighborhood is a cubic volume including seven voxels having 32 physical values associated with the voxel vertices.

It is likewise known to utilize such three-dimensional arrays of interior physical values to generate visual images of the interior structures within the body. In the case of the human body, the visual images thus produced can be used for medical purposes such as diagnostics or for the planning of surgical procedures. In order to display two-dimensional images of such three-dimensional interior structures, however, it is necessary to locate the position of the surface of such structure within the array of physical values. This is accomplished by comparing the array values to a single threshold value, or to a range of threshold values, corresponding to the physical property values associated with that surface. Bones or any other tissue, for example, can be characterized by a known range of density values to which the array values can be compared.

Once the surface location is determined, this surface must be shaded so as to give the human eye the correct impression of the shape and disposition of that surface when it is displayed on a two-dimensional display device. To provide such shading, the angular direction of a vector normal to the surface at each point on the surface is compared to the viewing angle of the observer. The intensity of shading can then be adjusted so as to be proportional to the difference between these angles. Such angular difference information can also be used to control the colors incorporated in the displayed images, thus providing yet another visual clue to the surface disposition. Normal vectors with components directed away from the viewing angle can be ignored since the associated surfaces are hidden from view.

One method for approximating the surface of an internal structure is the so-called "marching cubes" method, disclosed in H. E. Cline et al. U.S. Pat. No. 4,710,876, granted Dec. 1, 1987, and assigned to applicants' assignee. In this method, the surface segment intersecting a voxel is approximated by one of a limited number of standardized plane polygonal surfaces intersecting the voxel. One particular standardized surface is selected by a vector representing the binary differences between the threshold value and the eight voxel vertex values. The surface-to-voxel intersection coordinates, as well as the normal vector, for each such standardized polygonal surface set can then be calculated or obtained by table look-up techniques. The final surface is assembled as a mosaic, using all of the standardized polygons as tessera or tiles. Appropriate intensity values derived from the normal vector angles can be displayed immediately for viewing, or stored for later display. H. E. Cline et al. U.S. Pat. No. 4,729,098, granted Mar. 1, 1988, and also assigned to applicants' assignee, shows a variation of the marching cubes method using nonlinear interpolation to locate more accurately the coordinates of the tessellated standardized polygons.

Another method for approximating the surface of an internal structure is the so-called "dividing cubes" method, disclosed in H. E. Cline et al. U.S. Pat. No. 4,719,585, granted Jan. 12, 1988, and also assigned to applicants' assignee. In this method, the values at the vertices of the voxel are used to interpolate, in three dimensions, values at regularly positioned intra-voxel sub-grid locations. These interpolated sub-grid values can then be used to locate the surface position more precisely and to calculate the normal vector more accurately. The marching cubes and dividing cubes algorithms are further described in "Two Algorithms for the Three-Dimensional Reconstruction of Tomograms," by H. E. Cline et al., *Medical Physics*, Vol. 15, No. 3, p. 320, May/June 1988.

In order to distinguish between different internal structures with the same or similar physical property values, W. E. Lorensen et al. U.S. Pat. No. 4,751,643, granted Jun. 14, 1988, and likewise assigned to applicants' assignee, discloses a technique for labeling surfaces with similar property values and using adjacency criteria with respect to a "seed" location in the particular structure of interest to segregate the desired surface from all of the labeled surfaces. The copending application of H. E. Cline et al., Ser. No. 907,333, filed Sep. 15, 1986, now U.S. Pat. No. 4,791,567, also assigned to applicants' assignee, discloses another technique of segregating similar structures by determining connectivity from adjacency information. More particularly, adjacency is determined independently for each slice in the data store array, and thereafter adjacency is determined between slices. Copending application Ser. No. 943,357, filed Dec. 19, 1986, now U.S. Pat. No. 4,879,668, for H. E. Cline et al., and also assigned to applicants' assignee, discloses yet another technique for differentiating internal structures in which a linear pass is made through the data array to locate and label all of the different structures along the scan line by counting structure interfaces. It is apparent that there are formidable obstacles to establishing the connectivity of surface data points in a three-dimensional array of data while discriminating against similar but unconnected surfaces.

While use of a single array of values of a physical property within the interior of a solid body to generate perspective images of arbitrarily selected internal structures within the body, seen as if viewed from arbitrarily chosen viewing angles, all by manipulating the selfsame single array of values, is known, some structures in the interior of the human body unfortunately have not responded well to this imaging technique. Closely adjacent and intermingled tissues with the same or closely similar values of the scanned physical property, for example, have been difficult or impossible to discriminate between. Attempts to image such tissues result in an image including multiple tissues with inadequate or concealed details. Blood vessels are one type of tissue which is particularly difficult to discriminate for these reasons. A similar kind of problem, and one solution to the problem, is discussed in "3D Reconstruction of the Brain from Magnetic Resonance Images Using a Connectivity Algorithm," by H. E. Cline et al., *Magnetic Resonance Imaging*, Vol. 5, No. 5, p. 345, 1987.

Nuclear magnetic resonance (NMR) imaging is better at contrasting soft tissues than CAT x-ray scans, but suffers from the fact that there are many more soft tissue surfaces that are identified by any given threshold surface value, as compared to surfaces such as bone and organs. The difficulty with the connectivity algorithms of the prior art in situations where surface values are close to each other is that they examine all adjacent voxels in order to find voxels intersecting the surface of interest. This procedure inherently tends to bridge to tissues with similar surface values even though the surfaces are not in fact connected. An additional problem with the prior art technique is the greatly increased amount of processing necessary to examine all of the adjacent voxels, increasing the delay in generating an image while at the same time producing images with inferior surface discrimination. The problem becomes particularly acute for three-dimensional vascular imaging, where the large number of closely spaced blood vessels accentuate the surface discrimination problem.

The connectivity algorithm described in the above-mentioned *Magnetic Resonance Imaging* article can be called a volume-dependent algorithm in that all of the voxels immediately adjacent to the faces of a seed voxel (i.e., all of the volume surrounding the seed voxel) are examined for surface intersections. Since other surfaces with the same or similar surface constants could also intersect such adjacent voxels, there exists the possibility of bridging to adjacent but actually unconnected surfaces. The problem of preventing bridging by better discriminating between closely intermingled surfaces with similar surface constants in three-dimensional imaging systems is of considerable concern in soft tissue imaging.

Accordingly, one object of the invention is to provide a method and apparatus for displaying images of interior surfaces within solid bodies, with good discrimination between surfaces that are closely intermingled.

Another object is to provide a three-dimensional imaging system and method wherein images of closely intermingled surfaces with similar surface physical property values are clearly discriminated without an undue amount of processing.

Another object is to provide a scanning method and apparatus for displaying images of interior portions of a human body with good discrimination between closely adjacent tissues having the same or closely similar values of the scanned physical property.

SUMMARY OF THE INVENTION

In accordance with the illustrative embodiment of the present invention, perspective two-dimensional images of difficult-to-discriminate interior surfaces are produced from three-dimensional regular arrays of physical values by an algorithm that relies on actual inter-voxel connectivity information, rather than merely on voxel adjacency, to discriminate in favor of a single interior surface. As in the prior art, a seed voxel is chosen which is known to be on the surface of interest. By analyzing the voxel vertex data, however, the algorithm of the present invention can be used to determine not only which of the neighboring voxels has a common face with the seed voxel, but also which of the common faces is actually penetrated by the surface of interest. By recursively following only the voxel faces penetrated by the surface of interest, a single interior surface can be more readily segregated from all of the other closely adjacent surfaces with the same or similar surface values. The image generated with this reduced set of intersected voxels is vastly superior to the images generated using the prior art methods due to the inclusion of only data points actually on the surface of interest. Once the surface voxels are isolated, then any of the known prior art methods of processing these voxels values for rapid display of high resolution images can be used.

An important feature of the present invention is the methodology for identifying those adjacent voxels having a common intersected face. Since typically not all of the faces of a voxel are intersected by the surface of interest, a significant reduction in the number of neighboring voxels that must be considered is achieved. This reduction in the number of voxels considered not only improves the quality of the resulting image, but also reduces the amount of processing necessary to obtain that image. In accordance with this feature of the invention, a simple comparison of voxel vertex values with the surface value generates an index which can be used to look up, in a table, which of the adjacent voxels with common faces is actually penetrated by the surface of interest. This simple look-up operation serves to provide all of the superior surface discrimination capabilities of the present invention with little or no increase in processing time.

The precision with which the connectivity algorithm of the present invention can follow a single surface allows its use in situations where the non-invasive data does not itself provide a large amount of discrimination between different surfaces. Classical instances in which such a low level of discrimination resides are the NMR data for soft brain tissues and for vascular morphology studies. Generating images from any data arrays, however, will also benefit from the higher level of selectivity obtainable by employing the algorithm of the present invention.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

In the method and apparatus of the present invention, a sequence of voxel elements is used to locate the intersection of a surface of interest with the voxels. A "voxel" in this connection is a three-dimensional parallelepiped defined by an array of data values representing physical values measured in the interior of a solid body by non-intrusive means. In accordance with the present invention, data from consecutive NMR or CAT scan slices are assembled into a three-dimensional array of values which can then be analyzed or processed to obtain two-dimensional images of the three-dimensional information. The generation of such three-dimensional interior data arrays is well known in the art and will not be further described here. It is sufficient to note that such data arrays are readily obtainable by well-known, non-intrusive methods such as computed axial tomographic (CAT) x-ray scanning systems, nuclear magnetic resonance (NMR) imaging systems, ultrasound scanning, positron emission tomography (PET) emission computed tomography (ECT) and multimodality imaging (MMI). Such methods produce planar arrays of data points, one planar array at each of a regular succession of adjacent "slices" through the solid body being scanned. Taken together, this succession of slices forms the three-dimensional array of data values. The system of the present invention can be used to improve the quality of the surface images generated from data acquired in any of the above non-invasive data-gathering techniques. The system of the present invention is particularly useful, however with NMR data due to the inherently smaller dynamic range in pixel intensities provided by NMR and the more complex morphology of the soft tissues contrasted by NMR techniques.

Figure 1:
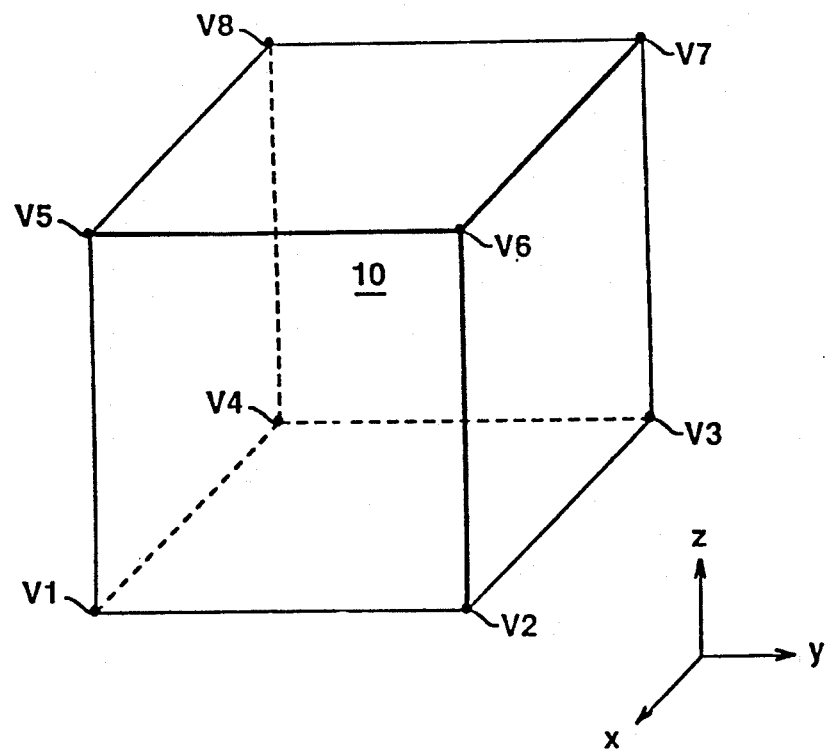
FIG. 1 is a perspective view illustrating a single voxel element defined by eight grid locations in an array of physical values obtained by non-intrusive means, useful in explaining operation of the present invention.

The array nature of the data values acquired by such non-invasive techniques can be seen in FIG. 1, which illustrates a single voxel element 10 with vertices V1 through V8. Each voxel element, such as element 10, spans two successive slices of data values. Associated with each vertex V1–V8 of voxel element 10 is a data value which represents the measurement of at least one physical property associated with the corresponding spatial position within the three-dimensional body. The spatial positions are located in regular patterns defining regularly spaced grid locations within the body. The grid positions, in turn, define a plurality of adjacent voxels like voxel 10 in FIG. 1.

In accordance with the present invention, a new and superior connectivity algorithm is used to follow a preselected internal surface through the voxels making up the data array. In particular, the immediately adjacent voxels, i.e., those voxels sharing a common face with the voxel of interest, are tested to determine whether or not each of the common faces is actually penetrated by the surface of interest. Only those voxels sharing a common face actually penetrated by the surface of interest are considered as candidates for surface voxels. The remaining adjacent voxels, also sharing a common face with the voxel of interest, but not actually penetrated by the surface of interest, are not considered as candidates for surface voxels. It is this elimination of adjacent voxels which are not intersected by the surface of interest that accounts for the superior discrimination of the algorithm of the present invention.

Figure 2:
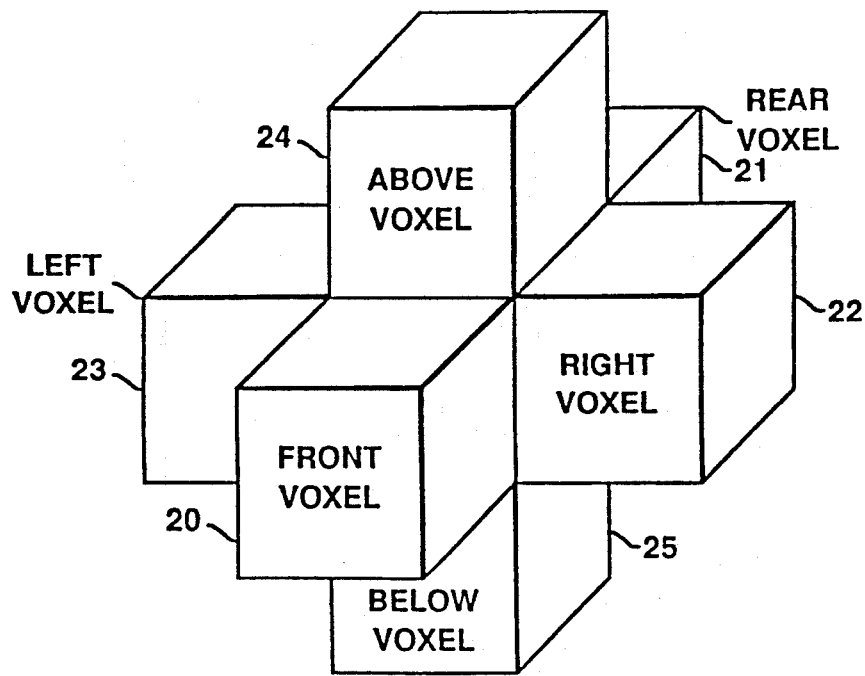
FIG. 2 is a perspective view of a voxel neighborhood, illustrating the adjacent voxels which might share a common intersected face, with the central voxel, also useful in explaining operation of the present invention.

As noted above, FIG. 1 discloses a single voxel. In FIG. 2, a perspective view of all of the immediately adjacent voxels sharing a common face with the voxel of interest is shown. These adjacent voxels with common faces are called the "neighborhood" voxels of the voxel of interest. The voxel of interest cannot be seen in FIG. 2 because it is concealed by the immediately adjacent neighborhood voxels. The neighborhood voxels include a front voxel 20 in front of the voxel of interest, a rear voxel 21 behind the voxel of interest, a right voxel 22 and a left voxel 23, on the right and left, respectively, of the voxel of interest, and an above voxel 24 and a below voxel 25 respectively located above and below the voxel of interest. Thus there are six neighborhood voxels which are immediately adjacent to, and share common faces with, the voxel of interest. In following a surface of interest, the algorithm of the present invention proceeds from the voxel of interest to one or more of the neighborhood voxels of FIG. 2 which share a common penetrated face. Prior art algorithms either tested all voxels in the data space for intersection with the surface of interest, or tested all voxels in the neighborhood of a seed voxel for intersection with the surface of interest. Since the test for intersection comprises a comparison with a constant value indicative of the surface, the prior art failed to discriminate against surface intersections with other surfaces having the same or a similar surface constant. This lack of discrimination causes bridging to the other surfaces, thereby increasing the number of voxels to be processed while, at the same time, reducing the value of the resulting image.

It can readily be seen that, if the address of the voxel of interest is given by (x,y,z) coordinates, then the addresses of the neighborhood voxels are given by:

| | | |
|---|---|---|
| front voxel 20 address: | $x + 1,y,z$ | (1) |
| rear voxel 21 address: | $x - 1,y,z$ | |
| right voxel 22 address: | $x,y + 1,z$ | |
| left voxel 23 address: | $x,y - 1,z$ | |
| above voxel 24 address: | $x,y,z + 1$ | |

-continued

| below voxel 25 address: | x,y,z − 1 |

These relative addresses provide a mechanism to readily access the neighborhood voxel vertex values. These neighborhood voxel values, in turn, are used for both the calculation of the normal values, to be described hereinafter, and for following a surface of interest through to the adjacent voxels.

In order to understand the connectivity algorithm of the present invention, it is first necessary to analyze the ways in which a surface of interest can intersect a voxel. Although there are an infinite number of ways in which such a surface can intersect a voxel, these intersections can be classified by noting which of the eight voxel vertices are inside of the surface of interest, and which of the eight voxel vertices are outside of the surface of interest. Representing the inside vertices as "1s" and the outside vertices as "0s", each voxel has associated with it a binary voxel index made up of the "1s" and "0s" corresponding to the "insideness" and "outsideness" of the voxel vertices V1 through V8 (FIG. 1). It is clear that there are 256 different values for the voxel index, and hence 256 classes of different ways in which a surface can intersect a voxel. These 256 different ways of intersecting a voxel can be classified into only 15 topologically distinct patterns from which all of the others can be obtained by rotation and complementing. These 15 distinct patterns are illustrated in FIG. 3.

Figure 3:
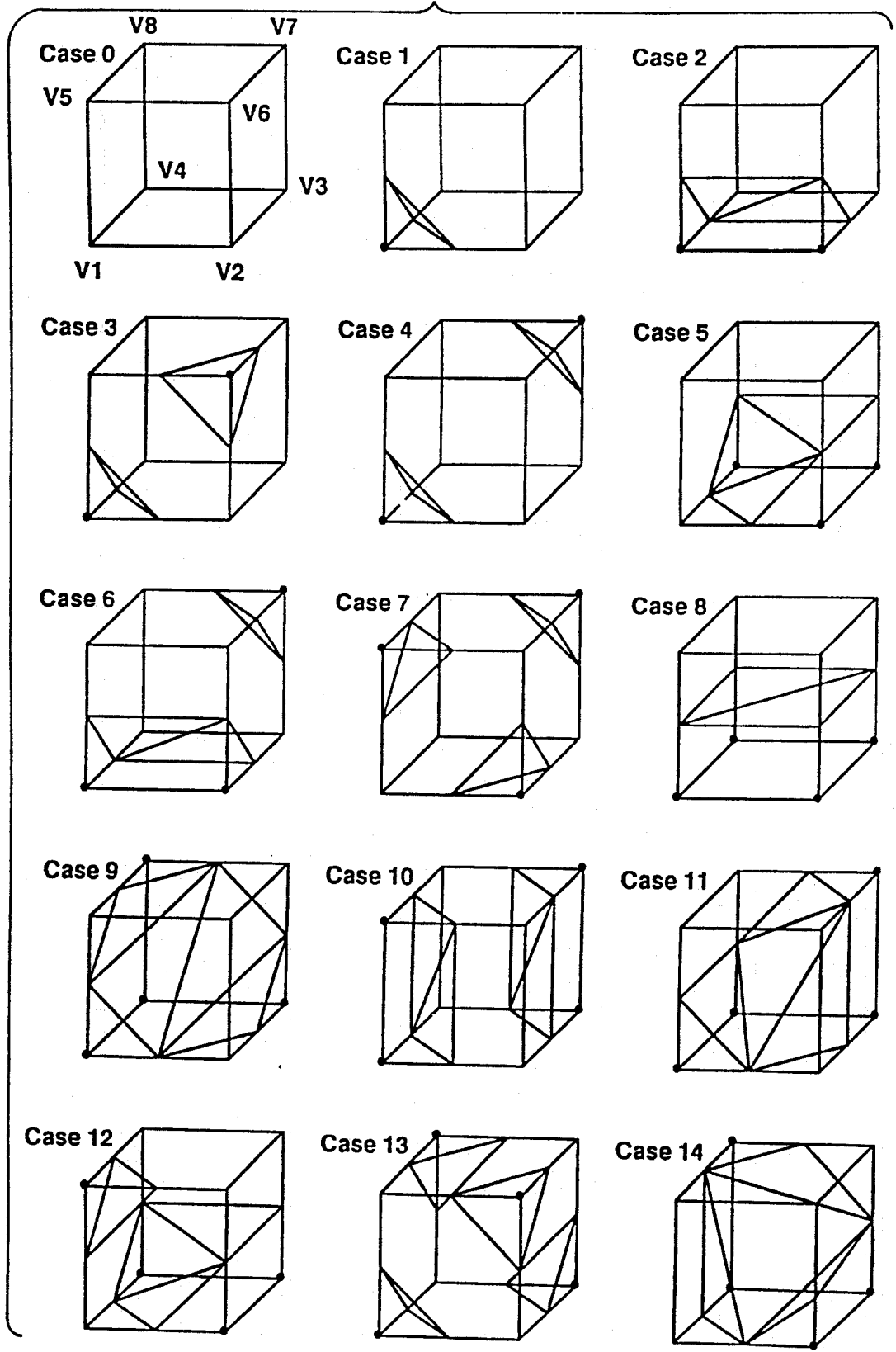
FIG. 3 is a schematic graphical illustration of the various possible ways in which a surface can intersect a single cubical voxel, useful in explaining the connectivity algorithm of the present invention.

FIG. 3 shows perspective views of 15 cubic voxels, 14 of which are exemplary of all of the topologically distinct ways in which a surface can intersect a voxel. The voxel vertices inside the intersecting surface of interest are represented by a closed circle. Case 0, of course, represents the case where there is no intersection. For convenience, the intersecting surfaces in the remainder of the cases of FIG. 3 are approximated by tessellations of triangular areas having their vertices located at the midpoints of the voxel edges. Since the algorithm employed in the present invention is concerned only with identification of the faces of the voxel penetrated by the surface of interest, this approximation is entirely adequate.

Using the topologically distinct cases illustrated in FIG. 3, a voxel face adjacency table can be constructed, showing which of the voxel faces are actually penetrated by the intersecting surface for each of the cases. The following Table I is such an adjacency table. In Table I, a "1" stands for a face which is penetrated by the surface of interest, while a "0" stands for a face not penetrated by the surface of interest. The faces are identified by the front, rear, right, left, above and below designations of the adjacent voxels in FIG. 2.

The adjacency information of FIG. 3 can be summarized as follows:

TABLE I

| Case No. | Index | Front | Rear | Right | Left | Above | Below |
|---|---|---|---|---|---|---|---|
| 0 | 00000000 | 0 | 0 | 0 | 0 | 0 | 0 |
| 1 | 10000000 | 1 | 0 | 0 | 1 | 0 | 1 |
| 2 | 11000000 | 1 | 0 | 1 | 1 | 0 | 1 |
| 3 | 10000100 | 1 | 0 | 1 | 1 | 1 | 1 |
| 4 | 10000010 | 1 | 1 | 1 | 1 | 1 | 1 |
| 5 | 01110000 | 1 | 1 | 1 | 1 | 0 | 1 |
| 6 | 11000010 | 1 | 1 | 1 | 1 | 1 | 1 |
| 7 | 01001010 | 1 | 1 | 1 | 1 | 1 | 1 |
| 8 | 11110000 | 1 | 1 | 1 | 1 | 0 | 0 |
| 9 | 10110001 | 1 | 1 | 1 | 1 | 1 | 1 |
| 10 | 10101010 | 1 | 1 | 1 | 1 | 1 | 1 |
| 11 | 10110010 | 1 | 1 | 1 | 1 | 1 | 1 |
| 12 | 01111000 | 1 | 1 | 1 | 1 | 1 | 1 |
| 13 | 10100101 | 1 | 1 | 1 | 1 | 1 | 1 |
| 14 | 01110001 | 1 | 1 | 1 | 1 | 1 | 1 |

The face adjacencies for all of the other voxel indices can be derived from these 15 by the standard rotation and complement operations inherent in the cubic symmetry.

It can be seen that Table I can be expanded into a table taking into account all of the possible 256 different voxel indices. Moreover, only the "1" entries in such a table indicate an adjacent voxel with a penetrated common face. In recursively following a surface from a seed voxel, the adjacent voxels represented by a "0" in Table I (and its expansion) need not be considered. The resulting decimation of the adjacent voxels to be considered not only reduces the amount of processing which must be done but also increases the surface discrimination in the resulting image.

Figure 4:
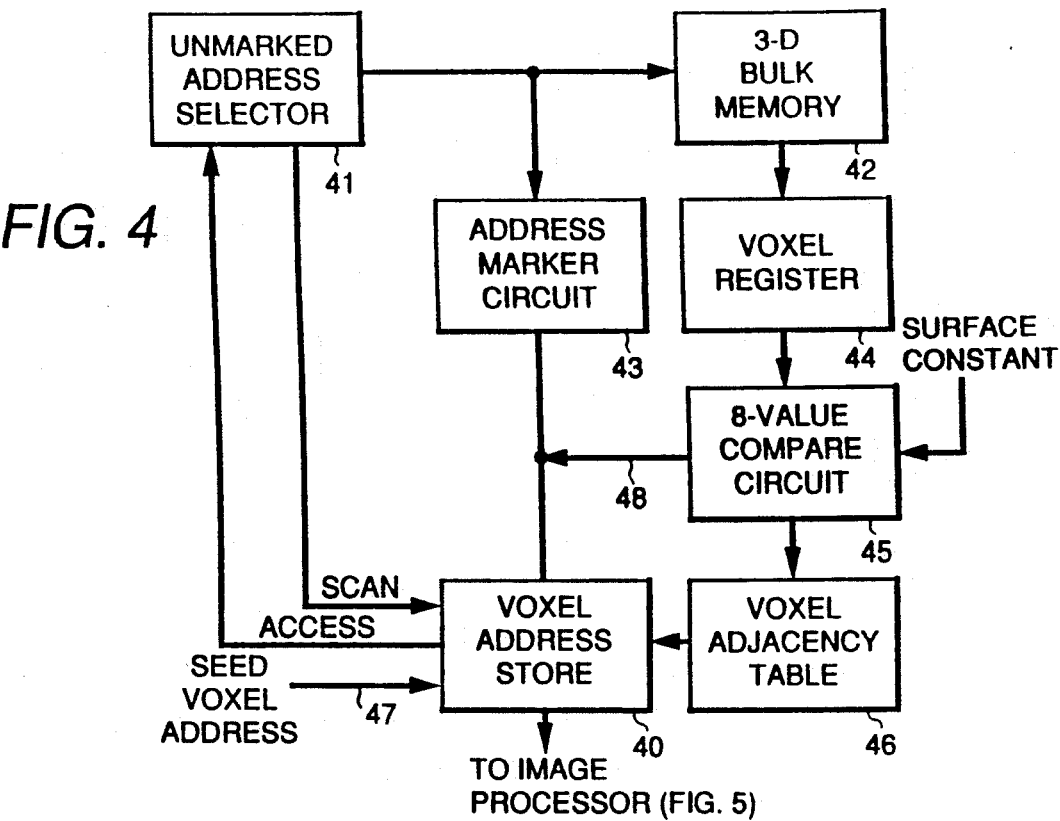
FIG. 4 is a general block diagram of a processing system for carrying out the surface connectivity algorithm employed in the present invention.

A system for carrying out the algorithm of the present invention is shown in block diagram form in FIG. 4. The system comprises a voxel decimator for selecting only those voxels from the data array which actually intersect a surface of interest. It is assumed that the address of a seed voxel, known to be on the surface of interest, is supplied to the decimator of FIG. 4 by way of a lead 47. Such seed voxel can be identified, for example, by using the cross-sectional image generator described in the copending application of H. E. Cline et al. Ser. No. 247,183, filed Sep. 21, 1988, now U.S. Pat. No. 4,984,157 and assigned to applicants' assignee. Such cross section generator, set to a high contrast and oriented perpendicular to the surface of interest, provides a readily usable technique for locating a voxel in the surface of interest. A blood vessel, for example, appears as a circle on such cross section, and is readily identified and located. The seed voxel address thus obtained is supplied by way of lead 47 to a voxel address store circuit 40. Voxel store circuit 40 is capable of storing a large plurality of addresses of voxels such as the voxel of FIG. 1, but fewer than the total number of voxels in the data array. Each of these voxel addresses is capable of accessing the eight voxel vertex values of the addressed voxel from a bulk memory 42. Voxel address store 40 is also capable of storing, for each voxel address, a mark which is associated with the voxel address but is not used as part of the address in accessing bulk memory 42.

An unmarked address selector 41 scans through the addresses in voxel address store 40 and locates and accesses the first address lacking an associated mark. This unmarked address is supplied by selector 41 to bulk memory 42 to access the eight voxel vertex values and store these vertex values in a voxel register 44. At the same time, an address marker circuit 43 is energized to mark that address in voxel address store 40. It is therefore apparent that each address in store 40 is accessed by selector 41 once, and only once, after which it is marked by circuit 43 and can no longer be accessed by selector 41.

The eight voxel vertex data values in voxel register 44 are compared to the constant surface value in an 8-value compare circuit 45. Compare circuit 45 determines if the surface value is greater than or less than each of the vertex values, and combines the binary results of these comparisons into an eight-bit binary index which is called the voxel index. This voxel index is used as a pointer to access the addresses (or address increments) of those voxels that share a common penetrated face with the voxel whose vertex values are stored in register 44. A voxel adjacency table 46 is, of course, an expanded version of Table I where the "1" entries can be used to increment or decrement the voxel address from selector 41 as shown in address definitions (1). The new addresses thus formed are added to the addresses in voxel address store 40. These new addresses can thereafter be selected, one at a time, by selector 41, to be used to access memory 42 for yet other voxels on the surface of interest.

If 8-value compare circuit 45 determines that the current voxel does not intersect the surface of interest, the address of that current voxel is removed from voxel address store 40 by way of a lead 48. That is, if the voxel index is all 0s (00000000) or all 1s (11111111), the surface is entirely inside of, or entirely outside of, the voxel and no intersection occurs. This is a further check on the connectivity implied by voxel adjacency table 46, and further improves the discrimination afforded by the algorithm of the present invention.

The circuit of FIG. 4 operates to accumulate in store 40 the addresses of all of the voxels in the data array which satisfy the adjacency criteria stored in abbreviated form in table 46, and which actually intersect the surface of interest, given at least one seed voxel address in store 40. The surface-following algorithm implemented by FIG. 4 terminates when selector 41 can no longer find an unmarked address in store 40. At that time, store 40 contains the addresses of all of the voxels in the data array which include intersections with a single surface represented by the seed voxel and by the surface constant applied to compare circuit 45. These voxel addresses can then be used, by any known prior art technique, to actually create the image for display. It should be noted, however, that the subsequent processing for image generation can be initiated just as soon as there is one address in store 40 and can proceed just as fast as new addresses are added to store 40. In the alternative, a complete set of addresses for a surface can be accumulated in store 40 and used at some later time to generate an image of the surface of interest.

Figure 5:
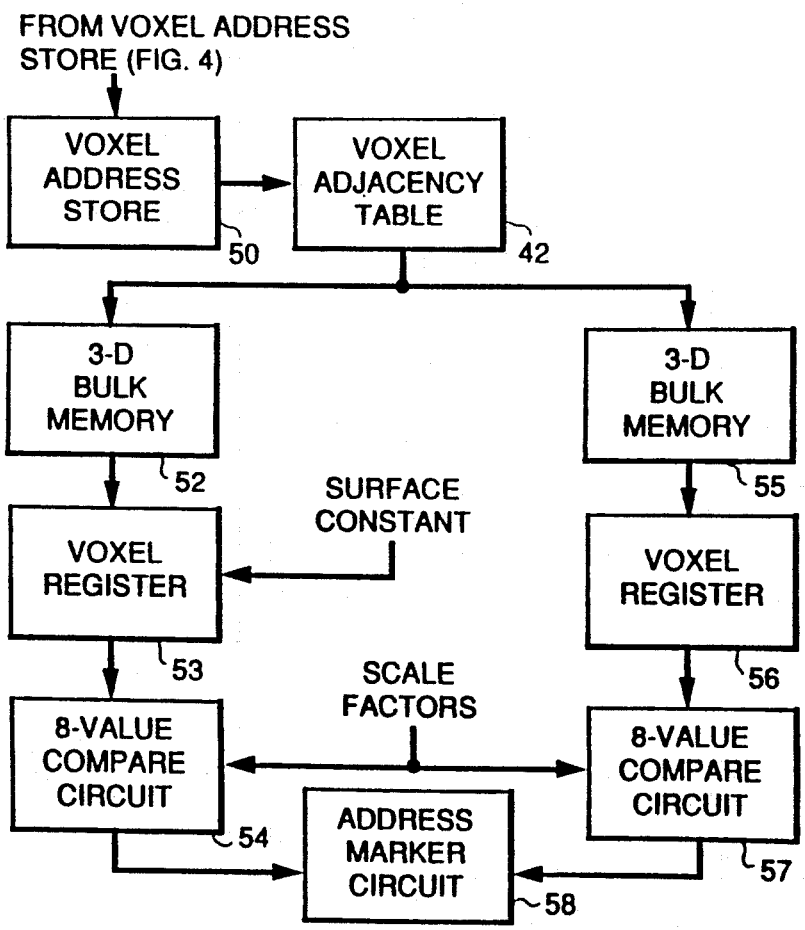
FIG. 5 is a general block diagram of one processing system which might be used for generating images of the three-dimensional surface from the voxels selected by the system of FIG. 4.

FIG. 5 is a block diagram of one such processor for generating an image of the surface of interest. The processor uses highly parallel circuits and a highly parallel architecture to rapidly generate images from the data identified in store 40. For purposes of illustration, the circuit of FIG. 5 uses the "dividing cubes" algorithm of the aforementioned U.S. Pat. No. 4,719,585, and the parallel processor of copending application Ser. No. 07/275,154, filed Nov. 22, 1988, now U.S. Pat. No. 4,985,834, to obtain images in real time to support ongoing surgical or other procedures. Alternatively, other algorithms, such as the "marching cubes" algorithm of the aforementioned U.S. Pat. No. 4,710,876, and other processors, can be used to process the data and to form the desired image of the surface.

In the system of FIG. 5, an address selector 50 selects the addresses from voxel address store 40 (FIG. 4), one at a time, and uses these addresses to access the voxel vertex values for storage in a voxel register 52 and to access the neighborhood voxel vertex values for storage in a neighborhood register 55. Using the "dividing cubes" algorithm, a voxel subdivider 54 generates sub-voxel addresses used by a voxel interpolator 53 to generate sub-voxel vertex values, all as described in the aforementioned application Ser. No. 07/275,154, now U.S. Pat. No. 4,985,834. These sub-voxel vertex values are also compared to the surface constant by the voxel interpolator to identify the sub-voxels intersected by the surface of interest.

Simultaneously, the neighborhood voxel vertex values in neighborhood register 55 are used in a normal calculator 56 to calculate the value of the normals to the surface intersecting the voxel. The gradient of the density function represented by the data array is used as the intensity of the image pixels in order to provide shading for the generated image. Such shading is proportional to the difference between the density gradient angle and the viewing angle. If the data array is a rectangular lattice with a unit cell of dimensions a, b and c, then the gradient vector $g=(g_x,g_y,g_z)$ can be established from the density function by taking central differences between the densities, $f(x_o,y_o,z_o)$, evaluated at the lattice point $(x_o,y_o,z_o)$:

$$g_x = \frac{f(x_0 + a, y_0, z_0) - f(x_0 - a, y_0, z_0)}{2a} \quad (2)$$

$$g_y = \frac{f(x_0, y_0 + b, z_0) - f(x_0, y_0 - b, z_0)}{2b}$$

$$g_z = \frac{f(x_0, y_0, z_0 + c) - f(x_0, y_0, z_0 - c)}{2c}$$

The normal calculator 56 implements equations (2) to derive unit normal vectors for each voxel vertex. The normal vector values for the sub-voxels identified by voxel subdivider 54 are interpolated from the voxel vertex unit normal values in a normal interpolator 57. The surface location values from voxel subdivider 54 and the normal (intensity) values from normal interpolator 57 are supplied to a display system 58. Display system 58 rotates the pixel points into the display plane, imposes the intensity value of the closest surface pixel at the display point, and displays the resulting image. Controls on the viewing angle and viewing depth are used to vary the view of the surface, all in accordance with well-known imaging techniques.

Figure 6:
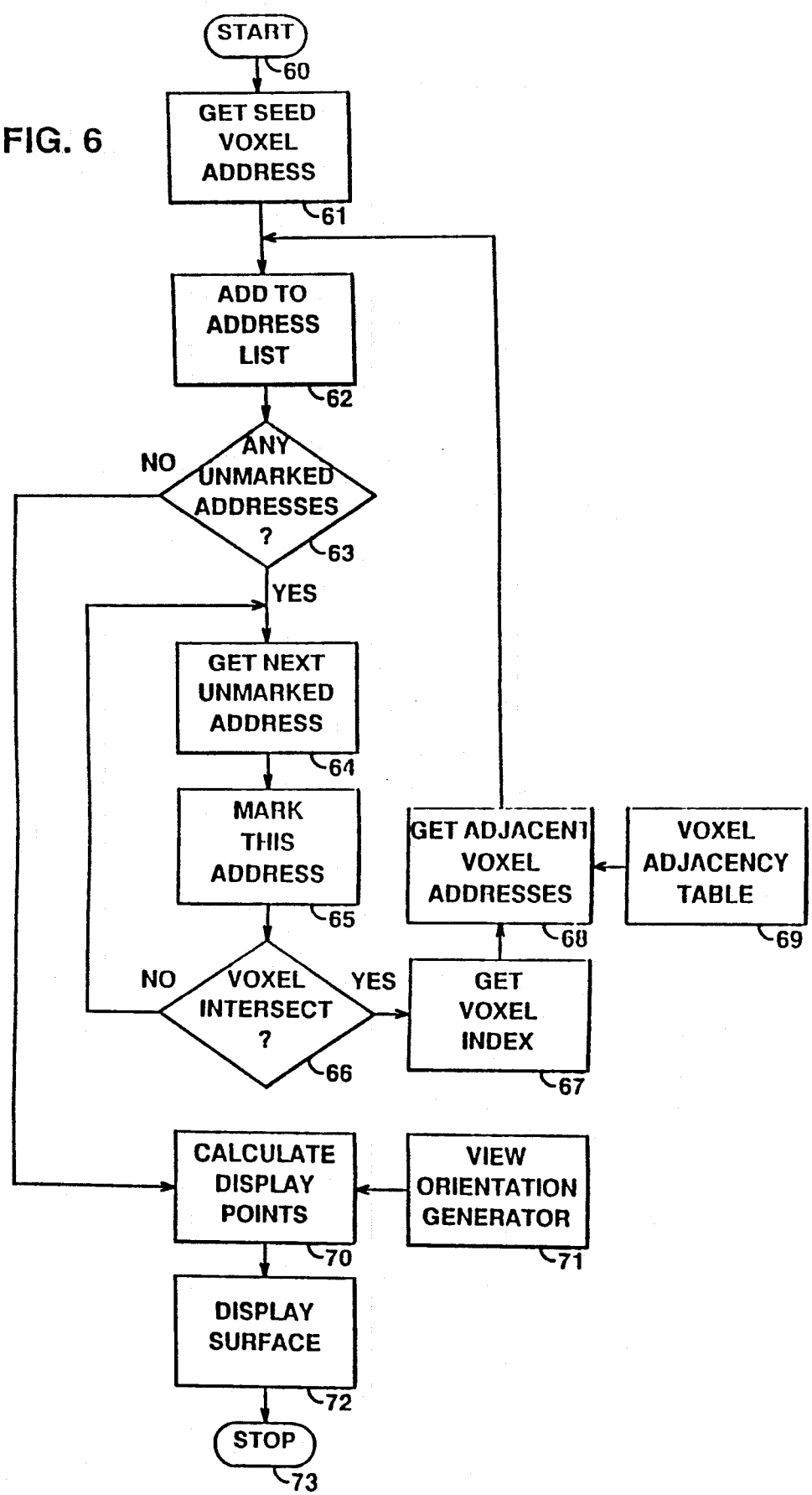
FIG. 6 is a flowchart of the process taking place in the surface connectivity discrimination system of the present invention.

The process carried out in the processing systems of FIGS. 4 and 5 of the drawings can be represented by the flow chart of FIG. 6. Starting at start box 60, the seed voxel address or addresses are obtained at box 61 and added to the address list at box 62. At decision box 63, it is determined if there are any unmarked addresses. If there is at least one unmarked address, box 64 is entered to get the next unmarked address. At box 65, this address is marked and, at decision box 66, the corresponding voxel vertex values are tested for surface intersection with this voxel. If there is no intersection with this voxel, the voxel address is eliminated from the voxel address store and the next unmarked address is obtained by re-entering box 64. If the voxel is intersected, the voxel index obtained from the comparison is obtained at box 67 and used at box 68 to obtain the address of adjacent surface voxels from the voxel adjacency table 69. These additional voxel addresses are added to the voxel address store at box 62 and the process continues.

If decision box 63 determines that there are no more unmarked addresses in the voxel address store, box 70 is entered to calculate the display points, using the output of a view orientation generator 71. The calculated display points are displayed at box 72 and the process terminated at box 73.

It should be clear to those skilled in the art that further embodiments of the present invention may be made by those skilled in the art without departing from the teachings of the present invention.

What is claimed is:

1. A system for displaying a two-dimensional image of an internal surface in a three-dimensional solid body, said system comprising:

means for storing three-dimensional signal patterns representing a value for at least one physical property associated with a three-dimensional body at regularly spaced grid locations defining voxel elements within said body;

means for selectively accessing eight values of said physical property defining one of said voxel elements from said storing means;

means for storing common face penetration information concerning possible intersections of voxels with a surface of interest;

means for generating a voxel index of surface penetration of a voxel, said voxel index comprising a binary string representing whether each voxel vertex is within or outside of said surface of interest;

means for utilizing said voxel index to access said common face penetration information;

means for utilizing said stored common face penetration information to recursively identify only voxels intersecting said surface of interest so as to avoid bridging between said surface of interest and other closely intermingled but unconnected surfaces having similar surface physical property values; and means for utilizing the identified voxels to display said two-dimensional image of said internal surface.

2. The system according to claim 1 wherein said voxel index generating means comprises means for simultaneously comparing all vertex values of said voxel to a value of said physical property indicative of said surface of interest.

3. A method for displaying a two-dimensional image of an internal surface within a three-dimensional solid body, said method comprising the steps of:

storing three-dimensional signal patterns representing the value of at least one physical property associated with a three-dimensional body at regularly spaced grid locations defining voxel elements within said body, each voxel having eight vertex values;

selectively accessing the eight voxel vertex values of said physical property for a stored one of said voxel elements;

storing common face penetration information concerning possible intersections of voxels with a surface of interests;

generating an index of surface penetration for each voxel, said index comprising a binary string representing which voxel vertex values are inside of said internal surface and which voxel vertex values are outside of said internal surface;

accessing common face penetration information associated with the corresponding voxel in accordance with the generated indices so as to avoid bridging between said surface of interest and other unconnected but closely intermingled surfaces having similar physical properties;

recursively identifying only those voxels having common faces penetrated by said internal surface; and displaying a two-dimensional image of said internal surface by utilizing only the identified voxels.

4. The method according to claim 3 wherein said step of generating an index includes the step of simultaneously comparing all of said voxel vertex values to a single value representing said internal surface.

* * * * *